US006539786B1

(12) United States Patent
Daly

(10) Patent No.: US 6,539,786 B1
(45) Date of Patent: Apr. 1, 2003

(54) SENSOR ATTACHMENT ARRANGEMENT HAVING EXTENDING MEMBERS

(75) Inventor: Paul D. Daly, Troy, MI (US)

(73) Assignee: Siemens Canada Limited, Tilbury (CA)

( * ) Notice: Subject to any disclaimer, the term of this patent is extended or adjusted under 35 U.S.C. 154(b) by 0 days.

(21) Appl. No.: 09/569,207

(22) Filed: May 11, 2000

Related U.S. Application Data

(60) Provisional application No. 60/133,822, filed on May 12, 1999.

(51) Int. Cl.⁷ .................................................. G01L 7/00
(52) U.S. Cl. ........................................................ 73/118.2
(58) Field of Search ............................... 73/118.2, 116, 73/117.2, 117.3, 118.1

(56) References Cited

U.S. PATENT DOCUMENTS

| | | | |
|---|---|---|---|
| 4,986,129 A | 1/1991 | Ruckenbauer et al. | 73/756 |
| 5,085,545 A | 2/1992 | Takahaski | 411/45 |
| 5,201,623 A | 4/1993 | Benedetti et al. | 411/48 |
| 5,317,924 A | 6/1994 | Maack | 73/756 |
| 5,355,726 A * | 10/1994 | Zurek et al. | 73/118.2 |
| 5,641,255 A | 6/1997 | Tanaka | 411/48 |
| 5,648,615 A * | 7/1997 | Jeske et al. | 73/756 |
| 5,667,184 A | 9/1997 | Nawa et al. | 248/500 |
| 5,693,879 A * | 12/1997 | Rilling et al. | 73/118.2 |
| 5,829,794 A | 11/1998 | Hans-Rudolf | |
| 5,945,606 A | 8/1999 | Tokunaga et al. | 73/756 |
| 5,987,996 A | 11/1999 | Kim et al. | 73/756 |
| 6,000,427 A | 12/1999 | Hutton | 137/597 |
| 6,006,610 A | 12/1999 | Lehnert | 73/862.08 |
| 6,070,462 A * | 6/2000 | Igarashi et al. | 73/118.2 |
| 6,182,639 B1 * | 2/2001 | Igarashi et al. | 73/118.2 |

FOREIGN PATENT DOCUMENTS

| | | |
|---|---|---|
| DE | 197 37 821 A | 3/1998 |
| EP | 0 365 146 A | 4/1990 |
| EP | 0 579 308 A | 1/1994 |
| GB | 801 735 A | 9/1958 |

OTHER PUBLICATIONS

European Search Report dated May 10, 2001.

* cited by examiner

*Primary Examiner*—Eric S. McCall

(57) ABSTRACT

A vehicle sensor assembly includes a plurality of engagement members which lock into a sensor receipt member attached to a vehicle gas directing component. Each of the engagement members include a first segment which is receivable within a corresponding slot and an enlarged segment which is preferably sized greater than the slot. To install the sensor assembly, the sensor assembly is pressed into the sensor receipt member until the enlarged segment of each engagement member encounters an associated extension. By providing additional force on the sensor assembly the engagement members are spread outward from their normal position to pass by the extensions such that the first segment snaps into the slots and the enlarged segments lock the sensor assembly into the installed position. Although no tools and only a minimum of force is required to install the sensor assembly, a much greater force is required to remove it.

32 Claims, 2 Drawing Sheets

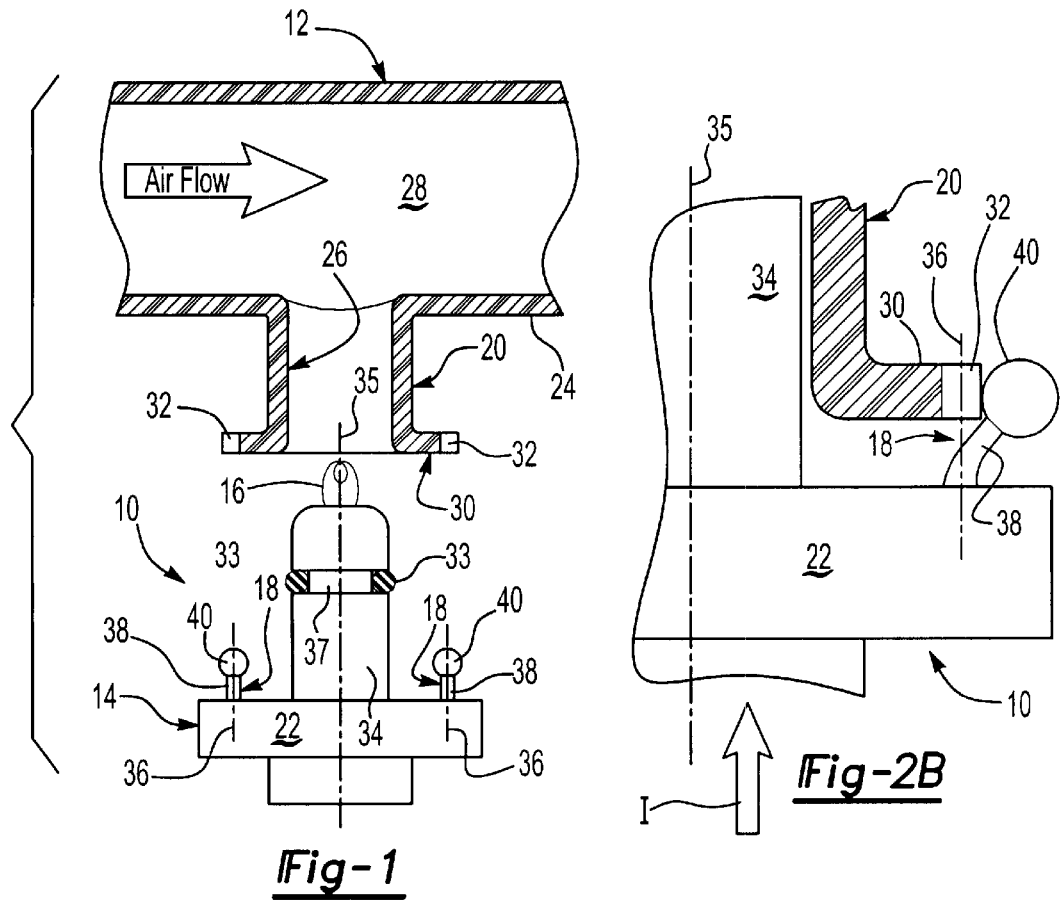
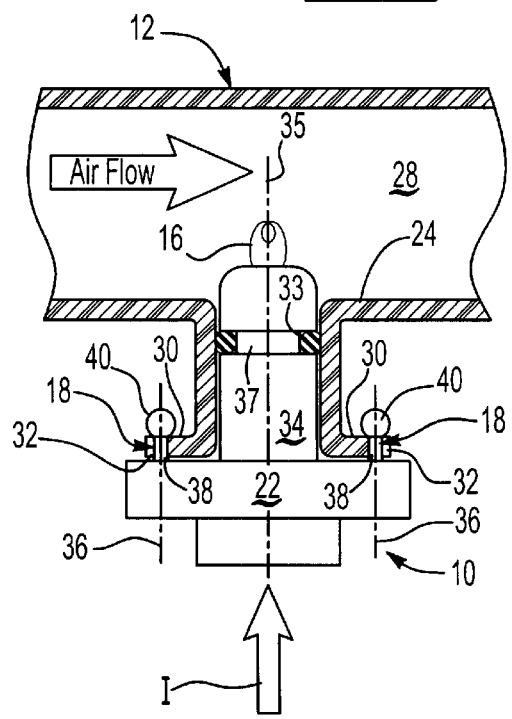
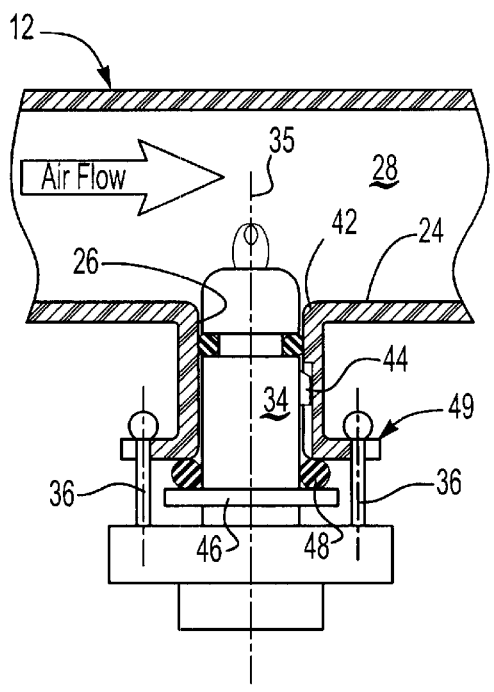

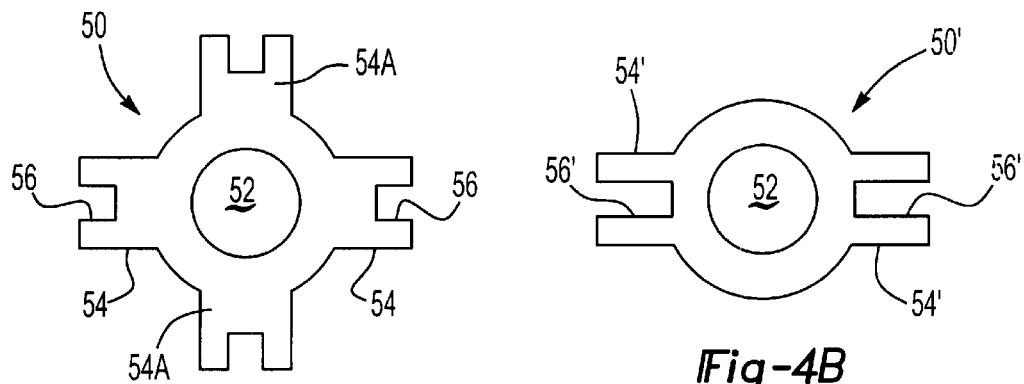
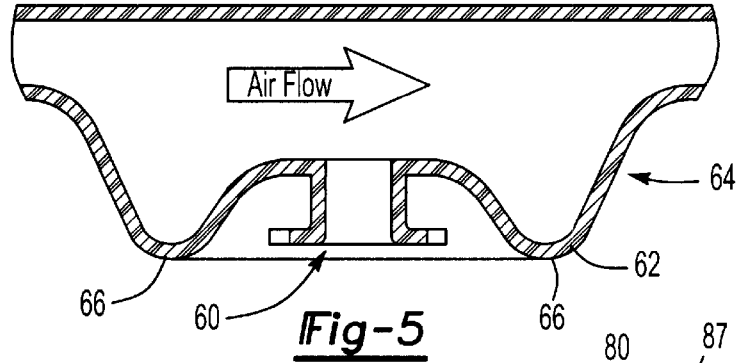
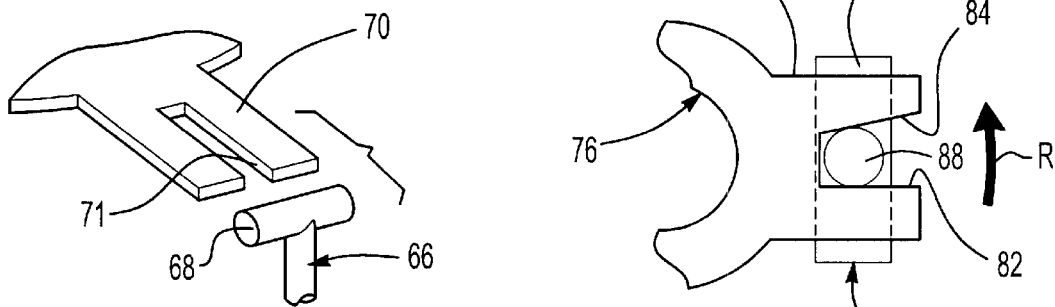
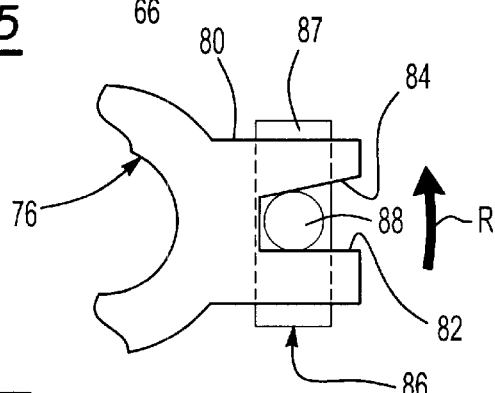

SENSOR ATTACHMENT ARRANGEMENT HAVING EXTENDING MEMBERS

The present application claims priority to U.S. Provisional Patent Application Serial No. 60/133,822, filed May 12, 1999.

BACKGROUND OF THE INVENTION

The present invention relates to a vehicle sensor, and more particularly to a sensor attachment arrangement for vehicle air induction components.

Various types of air induction components such as air induction manifolds, air filter assemblies and throttle bodies are used in the field of internal combustion engines. Many known air induction components are presently manufactured of a non-metallic material such as nylon to simplify fabrication and reduce weight.

The prevalence of substantially non-metallic air induction components can create difficulties for the installation of sensors such as temperature sensors, manifold absolute pressure (MAP) sensors, mass air flow sensors, potentiometers and the like. Such sensors are commonly threaded directly into apertures in the air induction components. Other sensors include extended tabs which receive threaded fastener that enter the air induction components. However, these common attachment arrangements can create residue stress between the threaded sensor or fastener. During use, the air induction component heats up and the threaded sensor or fastener may tend to relieve the residual stress by moving away from its installed position. The sensor may then shift away from its original position and cause a degradation of performance.

Another known sensor attachment arrangement includes a barb which snaps onto a ledge. However, the known barb and ledge is relatively easy to disengage. A measure of a snap fit is the locking ratio which can be defined as the force to put the snap-fit in, divided by the force to take the snap fit object out. The locking ratio for the known barb arrangement is approximately 1:2. That is, it requires approximately twice as much force to remove the barb as to insert it. Such a low locking retention ratio is disadvantageous when located adjacent a high-vibration vehicle component.

Known sensor attachment arrangements are also typically unique for each particular sensor. The unique attachment arrangements complicate manufacture of the air induction component and increases the difficulties of substituting sensors for different vehicle and engine types.

Accordingly, it is desirable to provide a sensor assembly which can be easily, securely and inexpensively attached to a non-metallic air induction component without the introduction of residual stress. It is further desirable to provide a generic attachment arrangement to simplify manufacture of the air induction component and allow the interchangeability of sensors.

SUMMARY OF THE INVENTION

The present invention provides a vehicle sensor assembly for use in a vehicle gas directing component such as an air intake manifold. The sensor assembly includes a sensor body having a plurality of engagement members which lock the sensor assembly into a sensor receipt member.

The sensor receipt member extends from an external wall of the gas directing component and provides an aperture into the interior of the gas directing component. To engage the sensor assembly, extensions protrude from the sensor receipt member which includes a slot which receives the engagement members.

Each of the engagement members of the sensor assembly define a secondary axis displaced from a primary axis defined along the sensor body. The engagement members each include a first segment which is receivable within a corresponding slot and an enlarged segment which is preferably sized greater than the slot. In one disclosed embodiment, the engagement member is substantially spherical in shape, however, other configurations are contemplated within the present invention.

To install the sensor assembly, a locating segment of the sensor assembly is initially inserted within the sensor receiving member aperture. The sensor assembly is then pressed into the aperture until the enlarged segment of each engagement member encounters an associated extension. By providing additional force on the sensor assembly contact between the enlarged segment of each engagement member forces the engagement members to spread outward from their normal position along their secondary axis. Further force allows the enlarged segments to pass completely by the extensions such that the first segment snaps into the slots and locks the sensor assembly into the installed position. Because the enlarged segment preferably cannot fit through the slot, great force is required to remove the sensor assembly. Thus, although no tools and only a minimum of force is required to install the sensor assembly, much greater force is required to remove it.

In one disclosed embodiment, additional alignment and anti-rotation features can be incorporated into the sensor assembly. Preferably, a slot located within the aperture receives a corresponding tab on the sensor assembly. By maintaining the tab within the slot, the sensor assembly is provided with an anti-rotation retention capability that does not rely entirely upon the engagement members.

In another disclosed embodiment, other installation features such as a radial flange extends from the locating segment. The flange assists in the installation of the sensor assembly by preventing the sensor assembly from being forced too deep into the aperture and is further available to axially compress a seal between the flange and a face of the sensor receipt member.

Another alternate embodiment of an engagement member includes a substantially cylindrical enlarged segment. Yet another disclosed embodiment provides a substantially airfoil appearing shape enlarged segment which engages with an extension as described above. A chamfered edge on the extension may be further adjusted to alter the engagement force.

Still another embodiment provides a sensor assembly removal feature. In this embodiment the extensions include a slot having one ramp-shaped side. By providing each slot with a ramped side, the sensor assembly can be twisted in the direction of the ramp-shaped side to disengage the engagement members from the extensions. Such an arrangement is particularly advantageous in recessed or difficult to reach locations.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general exploded view of a sensor assembly and associated vehicle gas directing component designed according to the present invention;

FIG. 2A is an assembled view of the sensor assembly of FIG. 1 installed in the associated vehicle gas directing component;

FIG. 2B is an expanded view of an engagement member of the sensor assembly of FIG. 1 passing by an extension;

FIG. 3 is an expanded view of an alternate embodiment of a sensor assembly having an anti-rotation member designed according to the present invention;

FIG. 4A is an enlarged facial view of a sensor receipt member designed according to the present invention;

FIG. 4B is an enlarged facial view of an alternate embodiment of a sensor receipt member designed according to the present invention;

FIG. 5 is a sectional view of a gas directing component;

FIG. 6A is an expanded view of an engagement member of the sensor assembly designed in accordance with the present invention;

FIG. 6B is another expanded view of an engagement member of the sensor assembly designed in accordance with the present invention; and FIG. 7 is yet another expanded view of an engagement member of the sensor assembly designed in accordance with the present invention.

DETAILED DESCRIPTION OF THE PREFERRED EMBODIMENT

FIG. 1 illustrates an exploded view of a vehicle sensor assembly 10 and a vehicle gas directing component 12 such as an air intake manifold. The sensor assembly 10 includes a sensor body 14 to retain a sensor element 16 such as a temperature sensor, manifold absolute pressure (MAP) sensor, mass air flow sensor, potentiometer or other sensor element. As will be further described below, the sensor assembly 10 includes a plurality of engagement members 18 which lock the sensor assembly 10 into a sensor receipt member 20.

The sensor receipt member 20 is preferably formed into the vehicle gas directing component 12 such as an air intake manifold. As illustrated in FIG. 1, the sensor receipt member 20 extends from an external wall 24 of the gas directing component 12 and provides an aperture 26 into the interior 28 of the gas directing component 12. To engage the sensor assembly 10, extensions 30 protrude from the sensor receipt member 20. Each extension 30 includes a slot 32 which receives a segment of the engagement members 18.

The sensor body 22 includes a locating segment 34 which fits within the aperture 26 and defines a primary axis 35. Preferably, a seal 33 such as an O-ring is fitted to a groove 37 in the locating segment 34 to assure an air-tight fit between the locating segment 34 and the aperture 26.

Each of the engagement members 18 define a secondary axis 36 displaced from the primary axis 35. The engagement members 18 each include a first segment 38 which is receivable within a corresponding extension 30 slot 32. An enlarged segment 40 of each engagement member 18 is preferably sized greater than the slot 32 to retain the engagement member 18 within the extension 30. In this disclosed embodiment, the engagement member 18 is substantially spherical in shape, however, other configurations are contemplated within the present invention.

Referring to FIG. 2A, the sensor assembly 10 is illustrated in an installed position. To install the sensor assembly 10, the locating segment 34 is initially inserted within the aperture 26. The sensor assembly 10 is then pressed in the direction of arrow I along the primary axis 35 until the enlarged segment 40 of each engagement member 18 encounters an associated extension 30. By providing additional force in the direction of arrow I, contact between the enlarged segment 40 of each engagement member 18 and each extension 30 forces the engagement members 18 to spread outward from their normal position along their secondary axis 36 (FIG. 2A). Because the enlarged segment 40 is preferably low resistance such as the disclosed spherical shape, minimal additional force is required to force the enlarged segment 40 around the extensions 30.

Further force in the direction of arrow I allows the enlarged segments 40 to pass by the extensions 30. The first segment 38 of the engagement members 18 can then snap into the slots 32 and lock the sensor assembly 10 into the installed position. Because the enlarged segment 40 preferably cannot fit through the slot 32, great force is required to remove the sensor assembly. Thus, although no tools and only a minimum of force is required to install the sensor assembly 10, a much greater force is required to remove it.

Additional alignment and anti-rotation features can be further incorporated into the sensor assembly 10. As illustrated in FIG. 3, a slot 42 can be located within the aperture 26 which receives a corresponding tab 44 on the sensor assembly. The slot 42 and tab 44 preferably assists in the alignment of the engagement member 18 with the extensions 30. In addition, the tab 44 can be located to remain within the slot upon full insertion of the sensor assembly 10. By maintaining the tab 44 within the slot 42, the sensor assembly 10 is provided with an anti-rotation retention feature that does not wholly rely upon the engagement members 18.

Other installation features may also be provided. A radial flange 46 preferably extends from the locating segment 34. The flange 46 assists in the installation of the sensor assembly by preventing the sensor assembly 10 from being forced too deep into the aperture 26. The flange 46 may further be used to axially compress a seal 48 between the flange 46 and a face 49 of the sensor receipt member 20. This seal can make seal 33 of FIG. 2A redundant.

Referring to FIG. 4A, one disclosed embodiment illustrates a facial view of a sensor receipt member 50 having an aperture 52 The extensions 54 include slots 56 which do not continue for the full length of the extensions 54. In other words, the slots 56 do not continue to the outer diameter of the sensor receipt member 50. Accordingly, the extensions 54 are stiffer than a sensor receipt member 50' having extensions 54' and slots 56' which do continue for the full length of the extensions 54' (FIG. 4B).

As illustrated in FIG. 4A, an additional set of extensions 54a are provided. The additional extensions 54a assure that should an extension 54 be broken off, for example during removal of the sensor assembly, the additional extension 54a allow for the immediate reinstallation of the sensor assembly without the necessity of repair of replacement of the entire gas directing component.

Referring to FIG. 5, an alternate embodiment of a sensor receipt member 60 is provided. As illustrated in the sectional view of FIG. 5, the sensor receipt member 60 extends from an external wall 62 of a gas directing component 64. However, the sensor receipt member 60 is substantially recessed below an outer surface 66 of the gas directing component 64. The sensor receipt member 60 is thereby additionally protected from inadvertent damage.

Referring to FIG. 6A, another disclosed embodiment of an engagement member 66 according to the present invention is provided. The disclosed engagement member 66 includes a substantially cylindrical enlarged segment 68.

The cylindrical enlarged segment 68 engages with an extension 70 having slot 71 as described above.

Referring to FIG. 6B, another disclosed embodiment of an engagement member 72 according to the present invention is provided. The disclosed engagement member 72 includes a substantially airfoil shaped enlarged segment 73 which engages with an extension 74 as described above. In addition, a chamfered edge 75 on the extension 74 may be additionally provided. The relationship between the chamfered edge 75 and airfoil shaped enlarged segment 73 may be further adjusted to alter the engagement force.

Referring to FIG. 7, yet another disclosed embodiment illustrates a top view of a sensor receipt member 76. The extensions 80 include a slot 82 having one ramp-shaped side 84. By providing slot 82 with a ramped side 84 on each extension 80, the sensor assembly can be twisted in the direction of arrow R to be removed. As illustrated, a first segment 88 of the engagement member 86 are forced outward along the ramped side 84 to disengage the engagement member 86. Thus, although the engagement member 86 can not be pulled out of the extension 80 because of the enlarged segment 87, it can be rotated out of the slot 82, when rotated in the direction of arrow R thereby using the ramped side 84 to force the engagement member 86 to be spread outward. Such an arrangement is particularly advantageous in recessed or difficult to reach locations.

The foregoing description is exemplary rather than limiting in nature. Many modifications and variations of the present invention are possible in light of the above teachings. The preferred embodiments of this invention have been disclosed, however, one of ordinary skill in the art would recognize that certain modifications are possible that would come within the scope of this invention. It is, therefore, to be understood that within the scope of the appended claims, the invention may be practiced otherwise than as specifically described. For that reason the following claims should be studied to determine the true scope of protection given for this invention.

What is claimed is:

1. A sensor assembly for a vehicle gas directing component comprising:
    a sensor receipt member extending from an external wall, said sensor receipt member comprising a plurality of extensions each including a slot, said plurality of extensions displaced from said external wall and extending from an open end of said sensor receipt member;
    a sensor body for insertion into said sensor receipt member, said sensor body defining a first axis; and
    a plurality of flexible engagement members attached to said sensor body, each of said flexible engagement members defining a secondary axis parallel to and displaced from said first axis, and each of said flexible engagement members comprising a first smaller segment receivable within one of said extension slots and an enlarged segment of a size larger than said slot retainable by said extension.

2. The sensor assembly as recited in claim 1, wherein said enlarged segment includes a substantially spherical portion.

3. The sensor assembly as recited in claim 1, wherein said enlarged segment includes a substantially cylindrical portion.

4. The sensor assembly as recited in claim 1, wherein said enlarged segment includes a substantially airfoil shaped portion.

5. The sensor assembly as recited in claim 1, further comprising a tab extending radially from a locating portion, said tab receivable within a slot in said sensor receipt member to prevent rotation therebetween.

6. The sensor assembly as recited in claim 1, wherein said plurality of extensions is more numerous than said plurality of engagement members.

7. The sensor assembly as recited in claim 1, wherein said slot includes a first side and a second side, said first side being substantially parallel to said second side.

8. The sensor assembly as recited in claim 1, wherein said slot includes a first side and a second side, said first side being substantially angled relative to said second side.

9. The sensor assembly as recited in claim 1, wherein said sensor receipt member is substantially recessed relative to an outer wall of a gas directing component.

10. The sensor assembly as recited in claim 1, wherein said first segment is flexible such that said enlarged segment deflects away from said second axis upon contact with said extension until said enlarged portion passes said extension and said enlarged segment returns to said second axis and into said slot to secure said sensor body to said sensor receipt member.

11. The sensor assembly as recited in claim 1, wherein said sensor receipt member is substantially cylindrical.

12. The sensor assembly as recited in claim 1, wherein said plurality of extensions extend in a cantilever manner from said sensor receipt member.

13. The sensor assembly as recited in claim 1, wherein each of said plurality of flexible engagement members provide a flexibility so that said enlarged segment flexes around each of said plurality of extensions such that said first smaller segment is received within said one of said extension slots.

14. The sensor assembly as recited in claim 1, further comprising a sensor element which extends from said sensor body such that said sensor element is located at least partially within said sensor receipt member.

15. A sensor assembly for a vehicle gas directing component comprising:
    a sensor receipt member extending from an external wall of a vehicle gas directing component, said sensor receipt member comprising a plurality of extensions each including a slot said plurality of extensions displaced from said external wall and extending from an open end of said sensor receipt member;
    a sensor body having a locating portion for insertion into said sensor receipt member, said locating portion defining a first axis; and
    a plurality of flexible engagement members attached to said sensor body, each of said flexible engagement members defining a secondary axis parallel to and displaced from said first axis, and each of said flexible engagement members comprising a first smaller segment receivable within one of said extension slots and an enlarged segment of a size larger than said slot retainable by said extension.

16. The sensor assembly as recited in claim 15, wherein said enlarged segment includes a substantially spherical portion.

17. The sensor assembly as recited in claim 15, wherein said enlarged segment includes a substantially cylindrical portion.

18. The sensor assembly as recited in claim 15, wherein said enlarged segment includes an airfoil shaped portion.

19. The sensor assembly as recited in claim 15, wherein said first segment is flexible such that said enlarged segment deflects away from said second axis upon contact with said extension until said enlarged segment passes said extension and said enlarged segment returns to said second axis and into said slot to secure said sensor body to said sensor receipt member.

20. The sensor assembly as recited in claim 15, wherein said sensor receipt member is substantially cylindrical.

21. The sensor assembly as recited in claim 15, wherein said plurality of extensions extend in a cantilever manner from said sensor receipt member.

22. The sensor assembly as recited in claim 15, wherein each of said plurality of flexible engagement members provide a flexibility so that said enlarged segment flexes around each of said plurality of extensions such that said first smaller segment is received within said one of said extension slots.

23. The sensor assembly as recited in claim 15, further comprising a sensor element which extends from said sensor body such that said sensor element is located at least partially within said sensor receipt member.

24. An air intake manifold assembly comprising:
   a sensor receipt member extending from an external wall of an air intake manifold, said sensor receipt member comprising a plurality of extensions, each of said extensions including a slot said plurality of extensions displaced from said external wall and extending from an open end of said sensor receipt member;
   a sensor body having a locating portion for insertion into said sensor receipt member, said locating portion defining a first axis; and
   a plurality of flexible engagement members attached to said sensor body, each of said flexible engagement members defining a secondary axis parallel to and displaced from said first axis, and each or said flexible engagement members comprising a first segment receivable within one of said extension slots and an enlarged segment of a size larger than said slot retainable by said extension.

25. The sensor assembly as recited in claim 24, wherein said sensor receipt member is substantially recessed relative to an outer wall of said air intake manifold.

26. The sensor assembly as recited in claim 24, wherein said enlarged segment includes an airfoil shaped portion.

27. The sensor assembly as recited in claim 24, wherein said enlarged segment includes a substantially elliptical shaped portion.

28. The sensor assembly as recited in claim 24, wherein said first segment is flexible such that said enlarged segment deflects away from said second axis upon contact with said extension until said enlarged portion passes said extension and said enlarged segment returns to said second axis and into said slot to secure said sensor body to said sensor receipt member.

29. The air intake manifold assembly as recited in claim 24, wherein said sensor receipt member is substantially cylindrical.

30. The air intake manifold assembly as recited in claim 24, wherein said plurality of extensions extend in a cantilever manner from said sensor receipt member.

31. The air intake manifold assembly as recited in claim 24, wherein each of said plurality of flexible engagement members provide a flexibility so that said enlarged segment flexes around each of said plurality of extensions such that said first smaller segment is received within said one of said extension slots.

32. The air intake manifold assembly as recited in claim 24, further comprising a sensor element which extends from said sensor body such that said sensor clement is located at least partially within said sensor receipt member.

* * * * *